(12) United States Patent
Li

(10) Patent No.: US 8,792,544 B2
(45) Date of Patent: Jul. 29, 2014

(54) EQUALIZATION DEVICE AND EQUALIZING METHOD THEREOF

(75) Inventor: Yi-Lin Li, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 21 days.

(21) Appl. No.: 13/563,753

(22) Filed: Aug. 1, 2012

(65) Prior Publication Data

US 2013/0034145 A1 Feb. 7, 2013

(30) Foreign Application Priority Data

Aug. 2, 2011 (TW) .............................. 100127382 A

(51) Int. Cl.
*H03H 7/30* (2006.01)
*H04L 25/03* (2006.01)

(52) U.S. Cl.
CPC .... *H04L 25/03057* (2013.01); *H04L 25/03267* (2013.01)
USPC ............ 375/233; 375/229; 375/232; 375/230

(58) Field of Classification Search
CPC ................. H04L 25/03057; H04L 2025/0349; H04L 2025/03503; H04L 25/03267; H04L 25/0328
USPC .................................. 375/233, 229, 232, 230
See application file for complete search history.

(56) References Cited

U.S. PATENT DOCUMENTS

| | | | | |
|---|---|---|---|---|
| 5,930,295 A | * | 7/1999 | Isley et al. | 375/219 |
| 2003/0231721 A1 | * | 12/2003 | Rouphael et al. | 375/341 |
| 2007/0104265 A1 | * | 5/2007 | Lin et al. | 375/233 |
| 2008/0205504 A1 | * | 8/2008 | Tsuie et al. | 375/233 |

* cited by examiner

*Primary Examiner* — Kenneth Lam
(74) *Attorney, Agent, or Firm* — McClure, Qualey & Rodack, LLP

(57) ABSTRACT

An equalization device is arranged for equalizing a received signal, wherein the received signal may include a primary signal and at least one interference signal. The equalization device may include a transformation module, a serial-to-parallel converter, and an equalization module, wherein the transformation module may include a predictive decision feed-back equalizer, a first feed-back filter and an adder. The transformation module is arranged for generating a transformation signal according to the primary signal and the at least one interference signal of the received signal, wherein the transformation signal includes a transformed primary signal and at least one transformed interference signal. The serial-to-parallel converter is arranged for respectively converting the transformed primary signal and the transformed interference signal into a plurality of transformation signal sequences. The equalization module is arranged for respectively equalizing the plurality of transformation signal sequences so as to generate a plurality of equalized sequences.

11 Claims, 5 Drawing Sheets

EQUALIZATION DEVICE AND EQUALIZING METHOD THEREOF

BACKGROUND OF THE INVENTION

1. Field of the Invention

The present disclosure relates to a communication system, and more particularly, to an equalization device of a communication system.

2. Description of the Prior Art

In communication systems, inter-symbol interference (ISI) is a common phenomenon. The primary cause of ISI is multipath propagation. When a transmission end transmits a symbol D(0), the symbol D(0) may pass through different paths before arriving at a receiving end. Since the symbol D(0) passing through the different paths corresponds to different delay times, the received signal of the symbol D(0) at the receiving end may include energies of a primary signal R(M1) and at least one interference signal R(M1+N1). Hence, when the transmission end sequentially transmits a plurality of symbols { ..., D(−3), D(−2), D(−1), D(0), D(1), D(2), D(3), ... } to the receiving end, the symbols D(N1) sent at time N1 may be affected by the interference signal R(M1+N1) resulting from the previously transmitted symbol D(0).

Equalizers are used to reduce the inter symbol interference (ISI), wherein common equalizers include linear feed-forward equalizers (LE), decision-feedback equalizers (DFE), and Viterbi equalizers. The disadvantage of the linear feed-forward equalizer is that noise is increased. A characteristic of the decision feedback equalizer is that ISI can be eliminated without increasing the noise; however, the signal energy cannot be fully utilized. A characteristic of the Viterbi equalizer is that the signal energy of the ISI can be fully utilized rather than be eliminated. When the length of multipath channel which produces the ISI (marked as "L") gets larger, however, the complexity of the Viterbi equalizer is directly proportional to "$2^L$". In other words, the complexity of the Viterbi equalizer is greatly increased as "L" is increased.

Hence, how to fully utilize the energies of the received signal while reducing the amount of operations of the Viterbi equalizer has become an important topic in this field.

SUMMARY OF THE INVENTION

It is one of the objectives of the present disclosure to provide an equalization device and a related equalizing method to solve the abovementioned problems.

According to one embodiment, an equalization device is provided. The equalization device may include a transformation module, a serial-to-parallel converter, and an equalization module. The transformation module includes a predictive decision feed-back equalizer, a first feed-back filter, and an adder, wherein the transformation module is arranged for generating a transformation signal according to a primary signal and at least one interference signal of the received signal, and the transformation signal comprises a transformed primary signal and at least one transformed interference signal. The serial-to-parallel converter is coupled to the transformation module, and is arranged for respectively converting the transformed primary signal and the at least one transformed interference signal into a plurality of transformation signal sequences. The equalization module is coupled to the serial-to-parallel converter, and is arranged for respectively equalizing the plurality of transformation signal sequences so as to generate a plurality of equalized sequences.

According to another embodiment, an equalizing method is provided. The method includes the following steps: generating a decision signal and a transformed primary signal according to the received signal; generating at least one transformed interference signal according to the decision signal; generating a transformation signal according to the primary signal and the at least one interference signal of the received signal, wherein the transformation signal comprises the transformed primary signal and the transformed interference signal; converting the transformation signal into a plurality of transformation signal sequences; and respectively equalizing the plurality of transformation signal sequences so as to generate a plurality of equalized sequences.

These and other objectives of the present disclosure will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
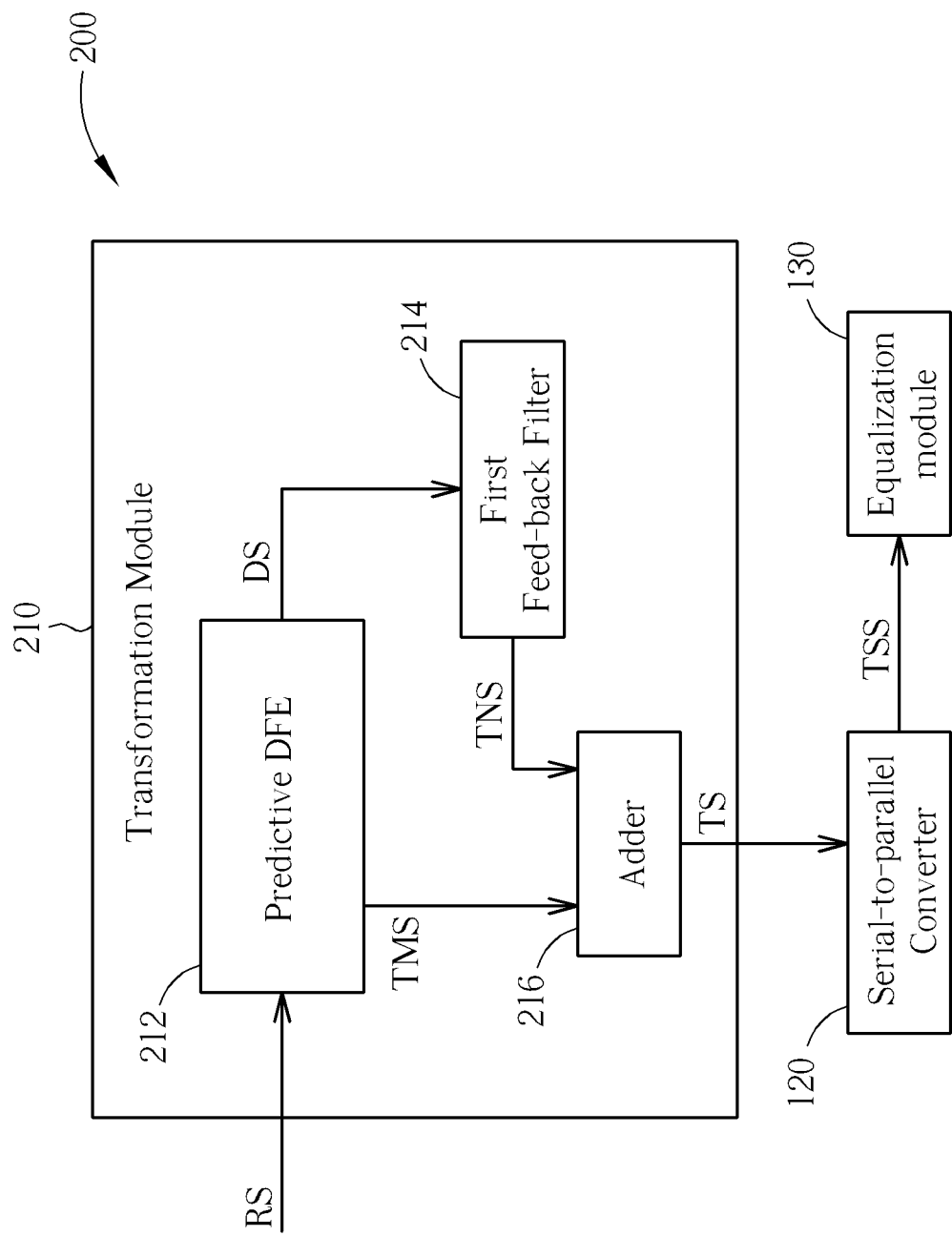
FIG. 1 is a block diagram of an equalization device according to a first embodiment of the present disclosure.

Please refer to FIG. 1, which is a block diagram of an equalization device 200 according to a first embodiment of the present disclosure. As shown in FIG. 1, the equalization device 200 may include a transformation module 210, a serial-to-parallel converter 120, and an equalization module 130. The transformation module 210 includes a predictive decision feed-back equalizer (predictive DFE) 212, a first feed-back filter 214, and an adder 216. The predictive DFE 212 is arranged for generating a decision signal DS and a transformed primary signal TMS according to a received signal RS. The first feed-back filter 214 is coupled to the predictive DFE 212, and is arranged for generating at least one transformed interference signal TNS according to the decision signal DS. The adder 216 is coupled to the predictive DFE 212 and the feed-back filter 214, and is arranged for generating the transformation signal TS according to the transformed primary signal TMS and the at least one transformed interference signal TNS. The serial-to-parallel converter 120 is coupled to the transformation module 210, and is arranged for respectively converting the transformed primary signal TMS and the transformed interference signal TNS into a plurality of transformation signal sequences TSS, wherein there is an identical interval N between the transformed primary signal TMS and the transformed interference signal TNS. As a result, the serial-to-parallel converter 120 is arranged for parallel outputting the transformed primary signal TMS and the transformed interference signal TNS according to the identical interval N in order to generate the plurality of transformation signal sequences TSS. An equivalent channel length of the plurality of transformation signal sequences TSS is equal to the signal length of the transformation signal TS-1/(N+1). The equalization module 130 is coupled to the serial-to-parallel converter 120, and is arranged for respectively equalizing the plurality of transformation signal sequences TSS so as to generate a plurality of equalized sequences. Please note that, in this embodiment, the equalization module 130 is implemented by a Viterbi equalization module, but this is not meant to be a limitation of the present disclosure. As operations related to the Viterbi equalization module are already well-known to those skilled in the art, further description is omitted here for brevity. In short, in this embodiment, the transformation module 210 reserves the interference signal NS of the received signal RS to be equalized by the Viterbi equalization module. Therefore, the received signal may have more energy which increases the accuracy of the judgment so that a better received signal is obtained.

Please note that, in this embodiment, the predictive DFE 212 may remove the interference signal NS from the received signal RS in order to generate the transformed primary signal TMS. In addition, the transformed interference signal TNS is generated according to the decision signal DS by the first feed-back filter 214. Therefore, the transformed interference signal TNS can be equalized by using the Viterbi equalization module so as to make the received signal have more energy.

Figure 2:
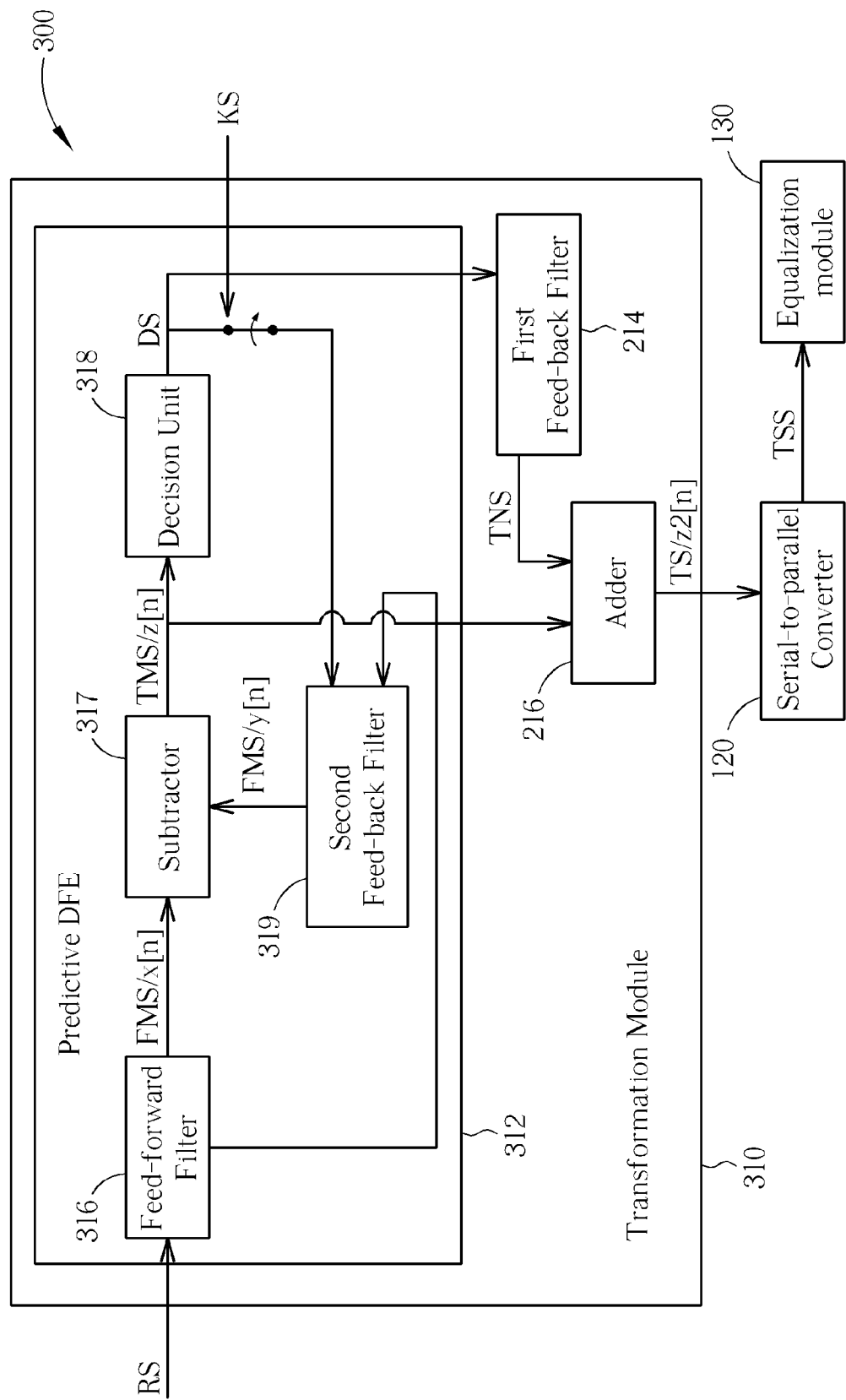
FIG. 2 is a block diagram of an equalization device according to a second embodiment of the present disclosure.

Please refer to FIG. 2, which is a block diagram of an equalization device 300 according to a preferred embodiment of the present disclosure. In FIG. 2, the predictive DFE 312 may include a feed-forward filter (FFF) 316, a subtractor 317, a decision unit 318, and a second feed-back filter 319. The feed-forward filter 316 is arranged for filtering the received signal RS to generate a filtered received signal FRS. The filtered received signal FRS may include a filtered primary signal FMS, at least one filtered interference signal FNS, and a noise level, as is shown in the equation (1) listed below:

$$x[n] = a[n] + n[n] + \sum_{k=1}^{Nb} b[k-n](x[n] - a[n]). \tag{1}$$

Herein, x[n] represents the filtered received signal FRS, a[n] represents the primary signal MS, $$\sum_{k=1}^{Nb} b[k-n](x[n] - a[n])$$

represents the at least one interference signal NS, and n[n] represents the noise level. Please note that, in this embodiment, the noise level is an unremovable signal, and thus further operation and further description of the noise level is omitted. Furthermore, the subtractor 317 is coupled to the feed-forward filter 316, and is arranged for generating the transformed primary signal TMS according to the filtered received signal FRS and a predictive surplus interference signal PNS. The decision unit 318 is arranged for generating a decision signal DS according to the transformed primary signal TMS. The second feed-back filter 319 is coupled to the feed-forward filter 316, and is arranged for generating the predictive surplus interference signal PNS according to the filtered received signal FRS and the decision signal DS or a designated signal KS, as is shown in the equation (2) listed below:

$$y[n] = \sum_{k=1}^{Nb} b[k-n](x[n] - a[n]). \tag{2}$$

Herein, y[n] represents the predictive surplus interference signal PNS. In this embodiment, the second feed-back filter 319 generates the predictive surplus interference signal PNS according to the filtered received signal FRS and the decision signal DS or the designated signal KS, such that the subtractor 317 can obtain the transformed primary signal TMS by subtracting the predictive surplus interference signal PNS from the filtered received signal FRS (x[n]−y[n]), as is shown in the equation (3) listed below:

$$z[n] = a[n] + n[n] + \sum_{k=1}^{Nb} b[k-n](d[n] - a[n]). \tag{3}$$

Herein, z[n] represents the transformed primary signal TMS. Please note that, when the decision signal DS is equal to the transformed primary signal TMS (d[n]=a[n]), the transformed primary signal TMS is ideally shown by the equation (4) listed below:

$$z[n] = a[n] + n[n] \tag{4}$$

Herein, z[n] represents the transformed primary signal TMS; n[n] represents the noise level. The decision unit 318 can then generate the decision signal DS according to the received signal RS. What calls for special attention is that: the designated signal KS can be implemented by a signal related to the primary signal or a known symbol signal. The operations concerning the predictive DFE 312 generating the decision signal DS according to the received signal RS and a predictive surplus interference signal PNS are well-known to those skilled in the art, and further description is omitted here for brevity. The adder 216 is able to generate the transformation signal TS according to the transformed primary signal TMS and the transformed interference signal TNS, as is shown in the equation (5) listed below:

$$z2[n] = z[n] + \sum_{j=1}^{(L\_eff-1)} b[jN-n]d[jN]. \tag{5}$$

Herein, z2[n] represents the transformation signal TS; z[n] represents the transformed primary signal TMS;

$$\sum_{j=1}^{(L\_eff-1)} b[jN-n]d[jN]$$

represents the transformed interference signal; N represents the identical interval; and L_eff represents the equivalent channel length.

Figure 3:
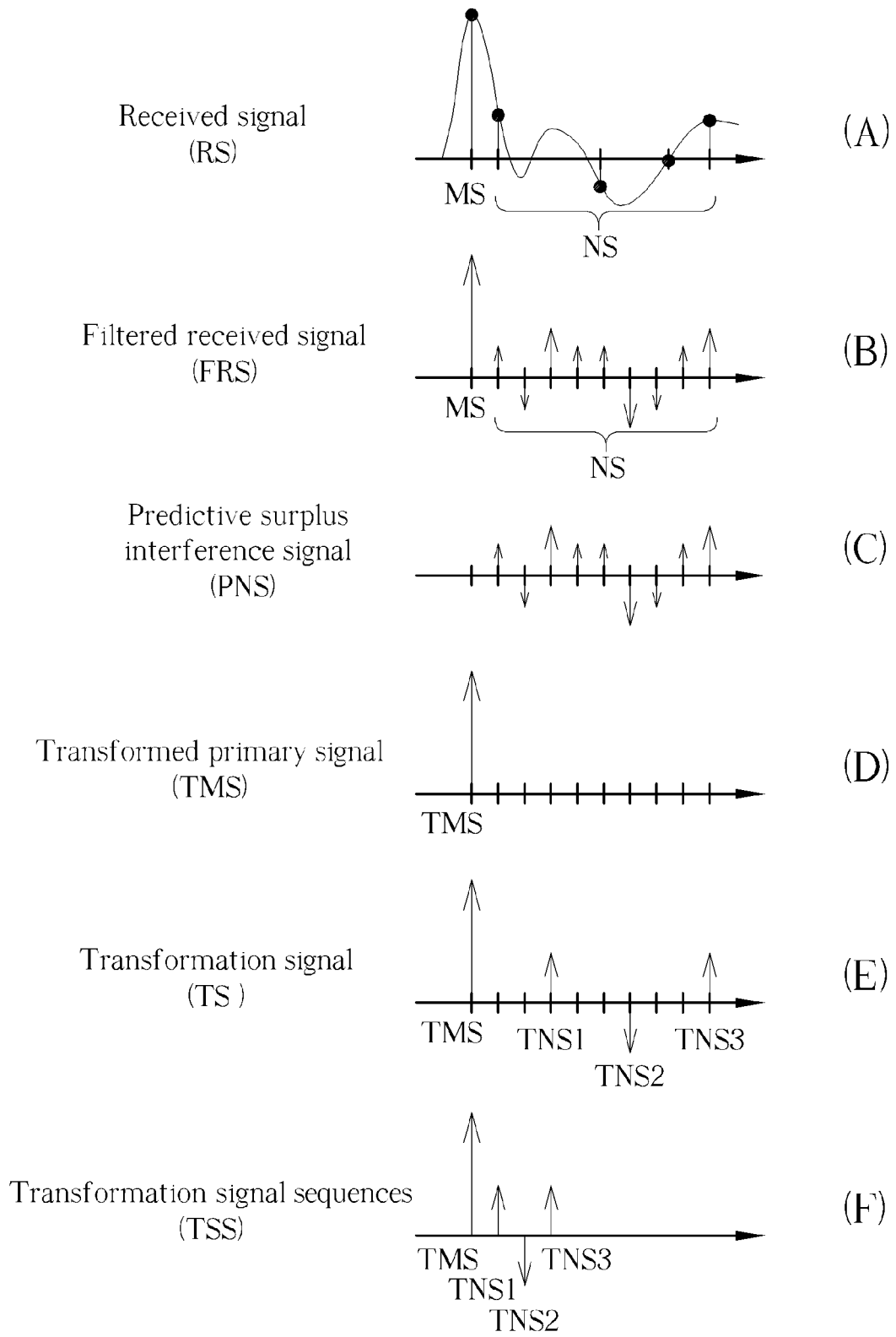
FIG. 3 is a diagram illustrating signal waveforms of the present disclosure.

In the following, the abovementioned signal waveforms are used to illustrate the present disclosure. Please refer to FIG. 2 together with FIG. 3. FIG. 3 is a diagram illustrating signal waveforms of the present disclosure. As shown in FIG. 3A, the received signal RS includes a primary signal MS and at least one interference signal NS. The feed-forward filter 316 is arranged for filtering the received signal RS to generate the filtered received signal FRS, as is shown in FIG. 3B. The second feed-back filter 319 is arranged for generating the predictive surplus interference signal PNS according to the filtered received signal FRS and the decision signal DS or a designated signal KS, as is shown in FIG. 3C. The subtractor 317 is arranged for generating the transformed primary signal TMS by subtracting the predictive surplus interference signal PNS from the filtered received signal FRS, as is shown in FIG. 3D. The first feed-back filter 214 then generates the transformed interference signal TNS according to the decision signal DS, such as the transformed interference signal TNS shown in FIG. 3E. The adder 216 is able to generate the transformation signal TS according to the transformed primary signal TMS and the transformed interference signal TNS, as is shown in FIG. 3E. After that, the serial-to-parallel converter 120 is able to respectively convert the transformed primary signal TMS and the transformed interference signal TNS into a plurality of transformation signal sequences TSS to be outputted in parallel according to the identical interval N, as is shown in FIG. 3F. Please note that, as shown in FIG. 3E, following the transformed primary signal TMS, there will be one interference signal which appears at every other three sampling points, i.e. TNS1.about.TNS3. Hence, the serial-to-parallel converter 120 is able to sample the transformed primary signal TMS and the transformed interference signal TNS according to the identical interval N (where N=3) in order to generate the plurality of transformation signal sequences TSS (including TMS, TNS1, TNS2, and TNS3). For this reason, the equalization module 130 can equivalently see 4((10−1)/3+1) equivalent channel lengths. Accordingly, the amount of the operations of the equalization module 130 is reduced.

Please note that the signal waveforms shown in FIG. 3 are presented merely to illustrate practicable designs of the present disclosure, and the present disclosure is not limited to this only. Furthermore, in one embodiment, the first feed-back filter 214 and the second feed-back filter 319 can each be implemented by a finite impulse response (FIR) filter, but this in no way should be considered as the limitation of the present disclosure.

Figure 4:
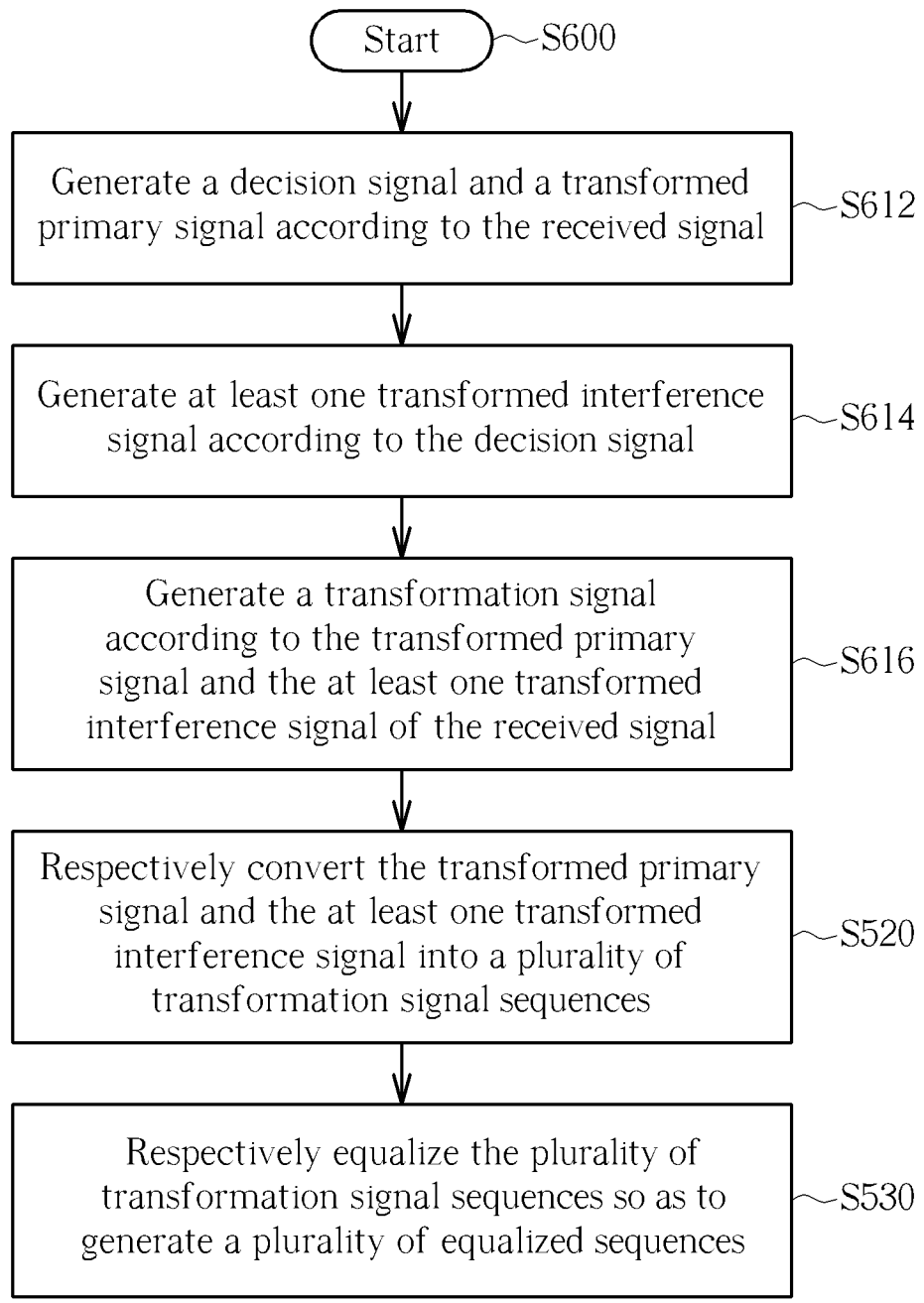
FIG. 4 is a flowchart illustrating an equalizing method according to an exemplary embodiment of the present disclosure.

Please refer to FIG. 4, which is a flowchart illustrating an equalizing method according to an exemplary embodiment of the present disclosure. The method shown in FIG. 4 includes, but is not limited to, the steps detailed below. Please note that the following steps are not limited to be performed according to the exact sequence shown in FIG. 4 if a roughly identical result can be obtained.

Step S600: Start.

Step S612: Generate a decision signal and a transformed primary signal according to the received signal.

Step S614: Generate at least one transformed interference signal according to the decision signal.

Step S616: Generate a transformation signal according to the transformed primary signal and the transformed interference signal of the received signal.

Step S520: Respectively convert the transformed primary signal and the transformed interference signal into a plurality of transformation signal sequences.

Step S530: Respectively equalize the plurality of transformation signal sequences so as to generate a plurality of equalized sequence.

Those skilled in the art can readily understand how each element operates by combining the steps shown in FIG. 4 and the elements shown in FIG. 1, and further description is therefore omitted here for brevity. What calls for special attention is that: step S612 is executed by the predictive decision feed-back equalizer 212, step S614 is executed by the first feed-back filter 214, and step S616 is executed by the adder 216.

Figure 5:
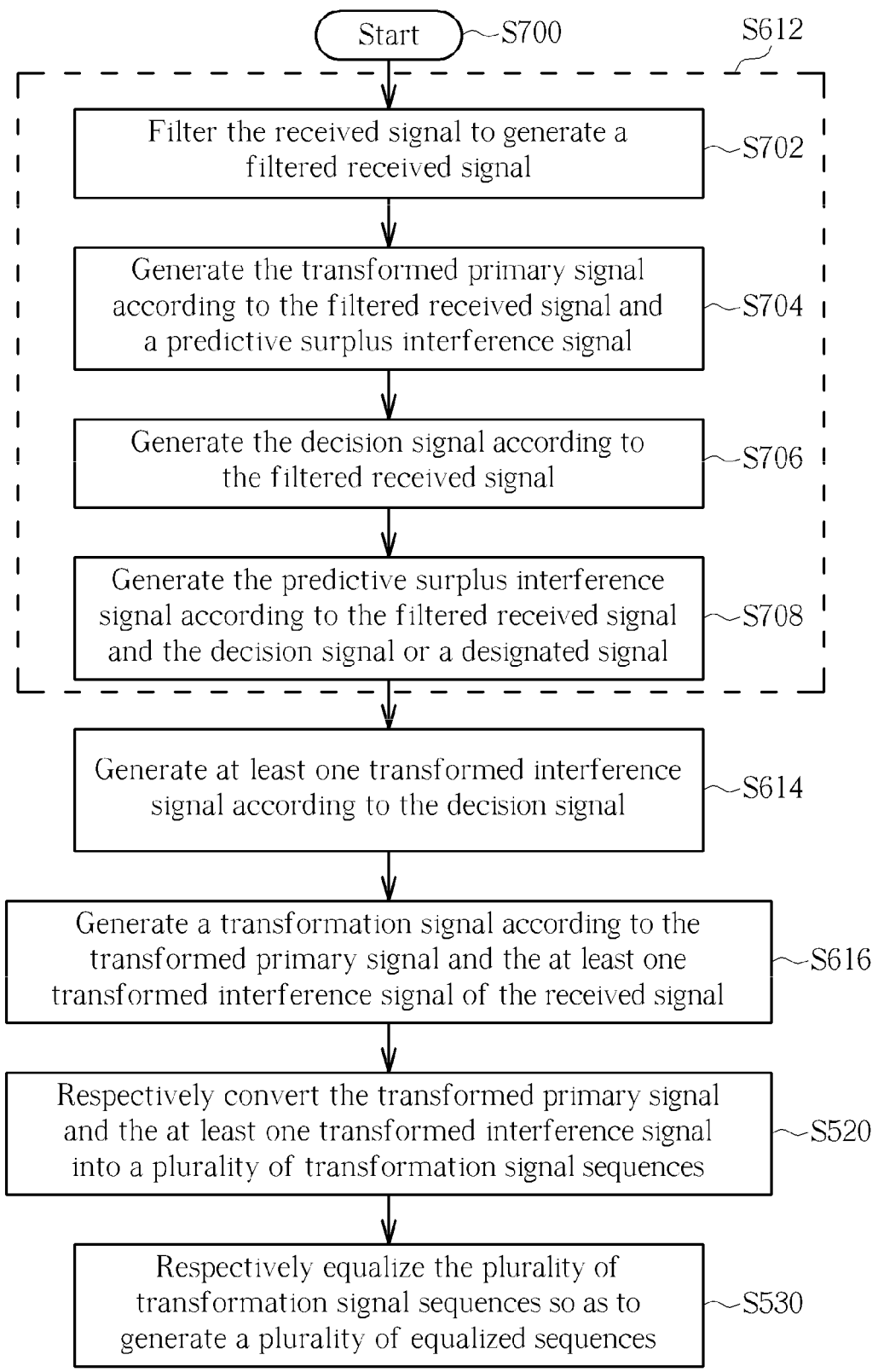
FIG. 5 is a flowchart illustrating the step S612 shown in FIG. 4 according to an exemplary embodiment of the present disclosure.

The step S612 shown in FIG. 4 includes the following steps, illustrated in FIG. 5:

Step S702: Filter the received signal to generate a filtered received signal.

Step S704: Generate the transformed primary signal according to the filtered received signal and a predictive surplus interference signal.

Step S706: Generate the decision signal according to the filtered received signal.

Step S708: Generate the predictive surplus interference signal according to the filtered received signal and the decision signal or a designated signal.

What calls for special attention is that: step S702 is executed by the feed-forward filter 316, step S704 is executed by the subtractor 317, step S706 is executed by the decision unit 318, and step S708 is executed by the second feed-back filter 319.

Please note that the steps of the abovementioned flowcharts are merely practicable embodiments of the present disclosure, and in no way should be considered to be limitations of the scope of the present disclosure. These methods can include other intermediate steps or several steps can be merged into a single step without departing from the spirit of the present disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An equalization device for equalizing a received signal, wherein the received signal comprises a primary signal and at least one interference signal, the equalization device comprising:

a transformation module, comprising a predictive decision feed-back equalizer, a first feed-back filter, and an adder, wherein the transformation module is arranged for generating a transformation signal according to the primary signal and the at least one interference signal of the received signal, and the transformation signal comprises a transformed primary signal and at least one transformed interference signal, wherein the predictive decision feed-back equalizer comprises a feed-forward filter and a second feed-back filter coupled together, the feed-forward filter arranged for filtering the received signal and providing the filtered signal to the second feed-back filter;

a serial-to-parallel converter, coupled to the transformation module, arranged for respectively converting the transformed primary signal and the at least one transformed interference signal into a plurality of transformation signal sequences; and an equalization module, coupled to the serial-to-parallel converter, arranged for respectively equalizing the plurality of transformation signal sequences so as to generate a plurality of equalized sequences.

2. The equalization device according to claim 1, wherein the predictive decision feed-back equalizer comprises:

a subtractor, coupled to the feed-forward filter, arranged for generating the transformed primary signal according to the filtered received signal and a predictive surplus interference signal; and a decision unit, coupled to the subtractor, arranged for generating a decision signal according to the filtered received signal wherein the second feed-back filter is arranged for receiving the filtered received signal from the feed-forward filter and the decision signal or a designated signal, the second feed-back filter arranged for generating the predictive surplus interference signal according to the filtered received signal and the decision signal or the designated signal.

3. The equalization device according to claim 2, wherein the designated signal is related to the primary signal or a known symbol signal.

4. The equalization device according to claim 2, wherein each of the first feed-back filter and the second feed-back filter is a finite impulse response (FIR) filter.

5. The equalization device according to claim 1, wherein there is an identical interval between the transformed primary signal and the transformed interference signal.

6. The equalization device according to claim 5, wherein the serial-to-parallel converter is arranged for parallel outputting the transformed primary signal and the transformed interference signal according to the identical interval in order to generate the plurality of transformation signal sequences.

7. The equalization device according to claim 1, wherein the equalization device is a Viterbi equalization module.

8. An equalizing method for equalizing a received signal having a primary signal and at least one interference signal, comprising:

filtering the received signal;

generating a decision signal;

receiving the filtered signal and the decision signal;

generating a predictive surplus interference signal according to the received filtered signal and the received decision signal or a designated signal;

generating a transformed primary signal according to the surplus interference signal and the filtered signal;

generating at least one transformed interference signal according to the decision signal;

generating a transformation signal according to the transformed primary signal and the at least one transformed interference signal;

converting the transformation signal into a plurality of transformation signal sequences; and respectively equalizing the plurality of transformation signal sequences so as to generate a plurality of equalized sequences.

9. The equalizing method according to claim 8, wherein the designated signal is related to the primary signal or a known symbol signal.

10. The equalizing method according to claim 8, wherein there is an identical interval between the transformed primary signal and the at least one transformed interference signal.

11. The equalizing method according to claim 10, wherein the step of converting the transformation signal into the plurality of transformation signal sequences comprises:

parallel outputting the transformed primary signal and the at least one transformed interference signal according to the identical interval in order to generate the plurality of transformation signal sequences.

* * * * *